(No Model.) 3 Sheets—Sheet 3.

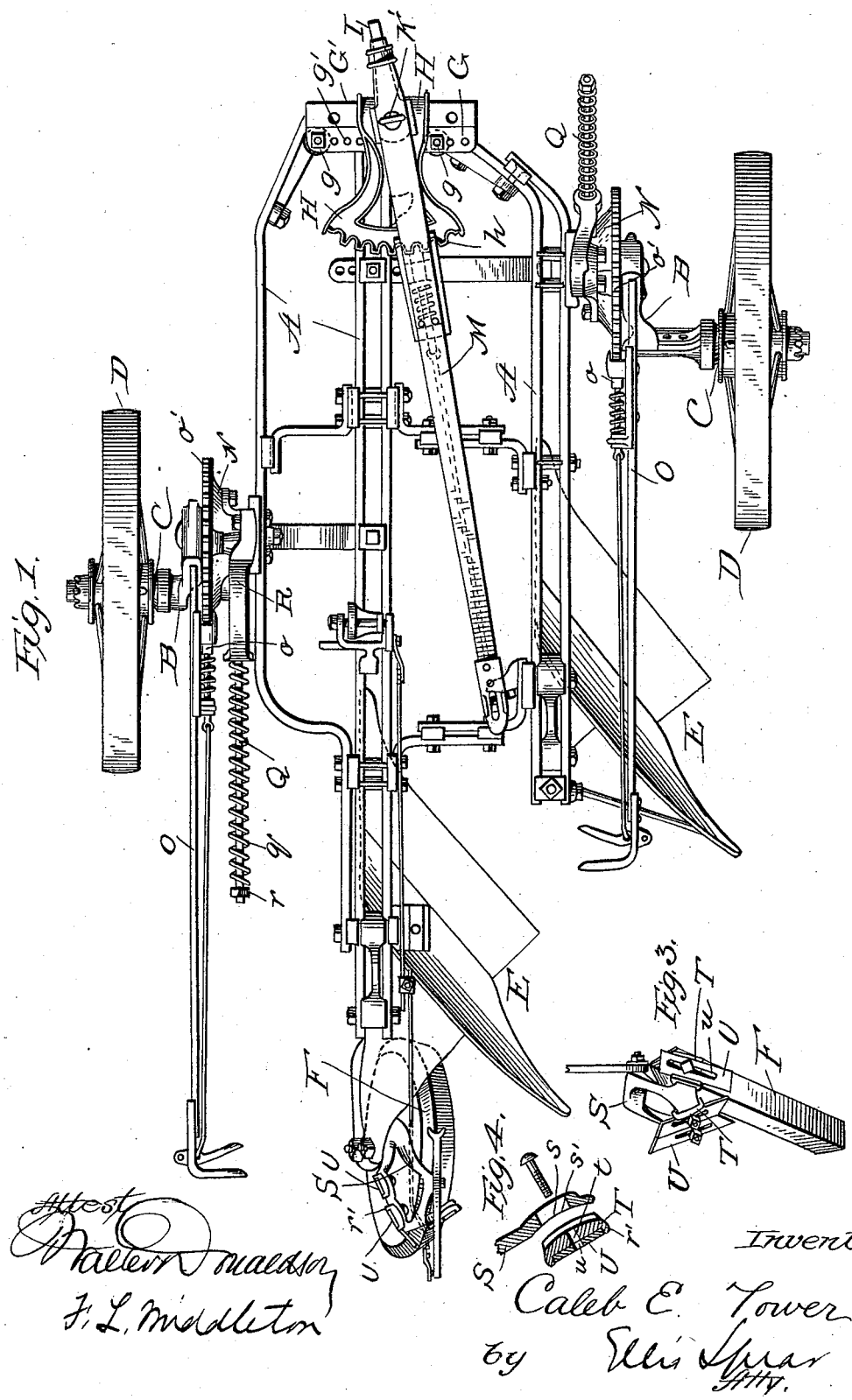

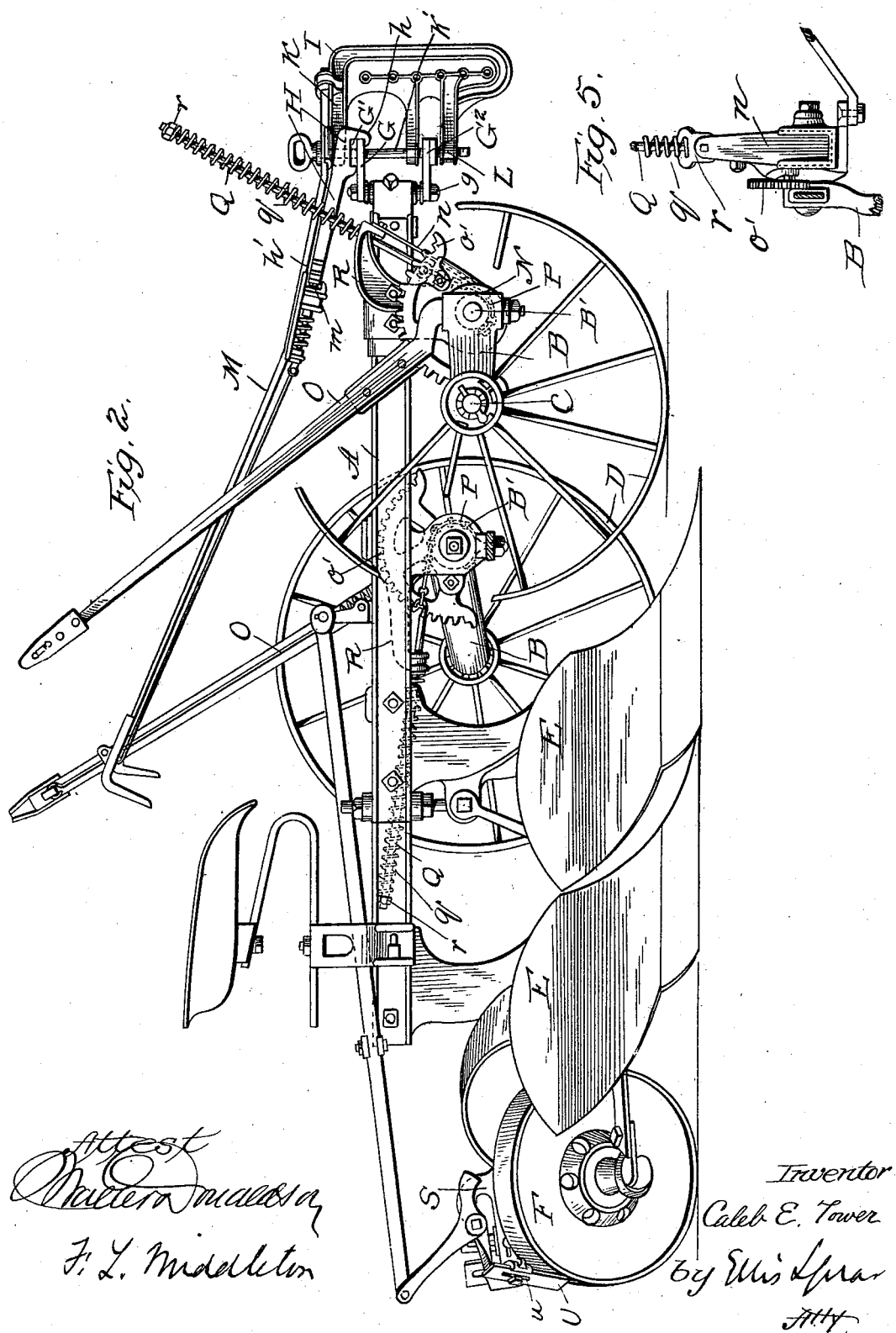

C. E. TOWER.
SULKY PLOW.

No. 510,733. Patented Dec. 12, 1893.

Attest:
Walter Niacason
J. L. Middleton

Inventor
Caleb E. Tower
by Ellis Spear
Atty

THE NATIONAL LITHOGRAPHING COMPANY,
WASHINGTON, D. C.

UNITED STATES PATENT OFFICE.

CALEB E. TOWER, OF SOUTH BEND, INDIANA, ASSIGNOR TO THE ECONOMIST PLOW COMPANY, OF SAME PLACE.

SULKY-PLOW.

SPECIFICATION forming part of Letters Patent No. 510,733, dated December 12, 1893.

Application filed June 26, 1893. Serial No. 478,810. (No model.)

*To all whom it may concern:*

Be it known that I, CALEB E. TOWER, a citizen of the United States of America, residing at South Bend, in the county of St. Joseph and State of Indiana, have invented certain new and useful Improvements in Sulky-Plows, of which the following is a specification.

This invention relates to certain improvements in the construction of sulky or wheeled plows.

One object of the invention is to provide means by which the clevis or draft plate which sustains the draft of the plow can be shifted in either direction by the operator while sitting in the seat to adjust the draft to the requirements of the soil.

Another object is to provide improved counterbalancing means to increase the ease with which the plow may be raised from the ground. I have also aimed to provide an improved construction of scraper for the following wheel, capable of quick and accurate adjustment. The plow constructed with these objects in view is illustrated in the accompanying drawings, in which—

Figure 6:
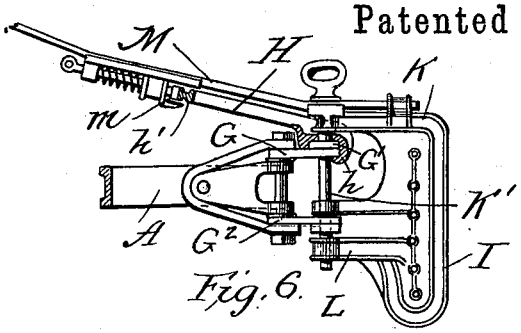
Figure 7:
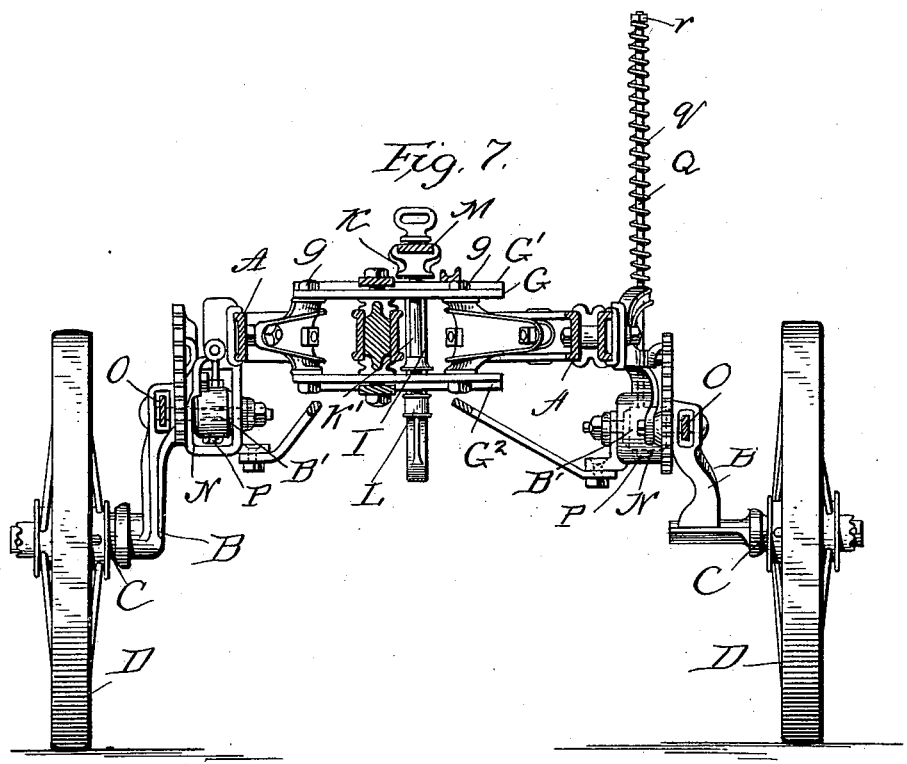

Figure 1— is a plan view of the plow. Fig. 2— is a side elevation with parts broken away. Fig. 3— is a detail view showing the scrapers attached to the follower or rear furrow wheel. Fig. 4— is a view of the scraper blades and their seats detached. Fig. 5— is a view of a detail. Fig. 6— is a detail view of the adjustable clevis. Fig. 7— is a transverse section with parts omitted.

Referring more particularly to these figures, A—A represent the main frame or platform of the plow constructed in the usual manner, and to which are pivotally connected the angular extensions B, of the axles C upon which the supporting wheels D are journaled.

The plows are shown at E—E, to the rear of which is connected the follower or furrow wheel F. Upon the forward end of the frame is mounted a plate or bar G, which is adjustable laterally of said frame and is secured thereto by bolts $g$, passing through holes $g'$ in the plate. This plate or bar G is provided with a raised portion $G'$ upon which slides a sector H, which has its base fitted to said raised portion and provided with fingers or projections $h$ which extend under the forward edge and serve to guide it thereon. A second plate $G^2$ is secured to the frame directly under the plate G and from these two is supported the clevis I which has arms K, L, which engage the upper and lower plates respectively and are secured thereto by bolt $K'$ passing through the aligning openings in the upper and lower plates and the arms of the clevis.

It will thus be seen that in starting out for the work of the day the clevis and sector can be adjusted upon the plates to the average position according to the width of cut desired or the number of horses employed. When the plow is in operation and hard or soft spots are encountered it is desirable to shift the clevis without requiring the operator to descend from his seat and to accomplish this, I provide a hand lever M which is rigidly connected to the upper end of the clevis and extends backward within convenient reach from the seat. This lever is provided with a suitable dog or pawl $m$, adapted to engage the notched edge $h'$, of the sector H, and by disengaging this dog, the lever may be swung either to the right or left, thus adjusting the clevis according to the requirements of the work.

The angular extensions B of the axles before referred to are journaled each in suitable boxes N depending from the under side of the frame and have each a hand lever O rigidly connected thereto, by which it may be rotated to raise or lower the frame and plows, the hand lever carrying a pawl $o$, engaging a sector $o'$ for retaining it in any desired position.

In order to counterbalance the weight of the frame with the plows and rider carried thereby and enable the same to be raised with greater ease, a chain P is provided which has one end secured to the shaft $B'$ of the extension B and is coiled thereon and has its other end secured to a rod Q passing through a suitable brace R, and surrounded by a coiled or helical spring $q$, which bears against the brace R at one end and against a nut $r$, at the other end, by means of which its tension may be adjusted.

It will be seen that as the plow is lowered into the ground, the chain will be wound upon the shaft and the spring compressed and when it is desired to raise the plow the spring will exert its force and assist in the raising of the plow.

It will be observed that the chain when wound upon the shaft is wholly within the casing or boxing N, which has a suitable annular space provided for the purpose and is thus wholly protected therein. A guard plate n is also provided to protect the chain and rod as it passes from the boxing Figs. 2 and 5.

In Figs. 3 and 4 I have illustrated in detail the scraper attachment for the rear or back furrow wheel. I have provided three of these scrapers one for each inclined edge of the wheel and one for the face and have secured them to the arm S, as will now be described. The arm S has a curved depression s, for each scraper, in which depression is seated a block T which has its rear face curved to conform to the depression while its front face is flat to receive the scraper blades and has guiding edges r' for guiding the edges of said blades. The blades U are provided with elongated slots u to enable them to be adadjusted lengthwise in the blocks, and they are clamped to the blocks and arm by bolts passing through the slot and the hole t in the block and through the slot s' in the arm. The slot in the arm extends in the direction of the curve of the depression therein permitting the block and scraper to be adjusted in said recess to take up any wear. The same bolt K' upon which the clevis is pivoted holds the segment in place and also serves to connect the lever with the clevis and as a pivot for the lever.

I claim—

1. In combination in a sulky plow, the frame, a pivoted clevis, a lever for operating the same, and a sector for the lever, said lever, clevis and sector being connected together and adjustable laterally of the frame, substantially as described.

2. In combination in a sulky plow the frame, the plate having the guide portion G', the sector having its base adapted to slide on said guide, the pivoted clevis and lever for operating the same, said parts being adjustable laterally with the sector, substantially as described.

3. In a sulky plow, a plate adjustably secured to the frame, a sector and clevis adjustably carried by said plate, said clevis having its rear edge pivotally connected with the plate, and a lever connected to the clevis and having a pawl engaging the sector, substantially as described.

4. In combination, in a plow the frame, the clevis pivoted at its front end, the segment, the lever for adjusting the clevis and the bolt K' passing through the clevis lever and segment base for holding said parts together and for pivoting the clevis and lever, substantially as described.

5. In a sulky plow, a frame provided with suitable boxes, axles for the plow wheels having angular extensions journaled in said boxes, and chains having one end connected to the axles and their free ends under spring tension, substantially as described.

6. In a sulky plow a frame provided with suitable boxes, the wheel axles having angular extensions journaled in said boxes, chains wound upon the extensions within the boxes with one end connected to said extensions and rods under spring tension sliding in the frame, the free ends of the chains being connected to said rods, substantially as described.

7. In a sulky plow, the combination with the rear furrow wheel of an arm having a circular depression with lateral slots, a block having a circular face fitting said depression, a scraper fitting said block and having an elongated opening therein, and a bolt passing through said elongated opening, through a hole in the block, and the slot in the arm and adjustably clamping said parts together, substantially as described.

In testimony whereof I affix my signature in presence of two witnesses.

CALEB E. TOWER.

Witnesses:
 L. PINE,
 F. P. CARMANY.